United States Patent [19]
Kindt-Larsen et al.

[11] Patent Number: 5,690,973
[45] Date of Patent: Nov. 25, 1997

[54] MOLD SEPARATION APPARATUS

[75] Inventors: Ture Kindt-Larsen, Holte, Denmark; Stephen Robert Beaton, Neptune Beach, Fla.; Wallace Anthony Martin, Orange Park, Fla.; Stephen Craig Pegram, Jacksonville, Fla.; Craig William Walker, Jacksonville, Fla.

[73] Assignee: Johnson & Johnson Vision Products, Inc., Jacksonville, Fla.

[21] Appl. No.: 462,501

[22] Filed: Jun. 5, 1995

Related U.S. Application Data

[62] Division of Ser. No. 258,265, Jun. 10, 1994.
[51] Int. Cl.$^6$ ............................................. B29D 11/00
[52] U.S. Cl. ............... 425/436 R; 425/440; 425/808; 425/DIG. 60; 264/334
[58] Field of Search ..................... 425/144, 143, 425/436 R, 436 RM, 441, 440, 443, 446, 808, DIG. 60; 264/334

[56] References Cited

U.S. PATENT DOCUMENTS

| | | | |
|---|---|---|---|
| 4,364,878 | 12/1982 | Laliberte et al. | 425/808 |
| 5,417,557 | 5/1995 | Ross et al. | 425/808 |

*Primary Examiner*—James P. Mackey

[57] ABSTRACT

An apparatus for separating individual contact lens mold assemblies that each contain a contact lens mold between a front curve mold half and a back curve mold half, each of the mold halves having annular circumferential flanges, is disclosed. The apparatus comprises a first device for applying steam at a first temperature to the back curve mold half to form a temperature gradient ranging from about 2.5° C. to 6.0° C. between the back curve mold half relative to the front curve mold half, and, a second device including a set of pry tools that are inserted between the circumferential flanges of the front mold and back mold halves of the contact lens mold assembly, the pry tools including a first set of pry fingers for retaining the front curve mold half and a second set of pry fingers for biasing the back curve mold half upwardly at a predetermined force with respect to the front curve mold half to effectively remove the back mold half therefrom.

9 Claims, 11 Drawing Sheets

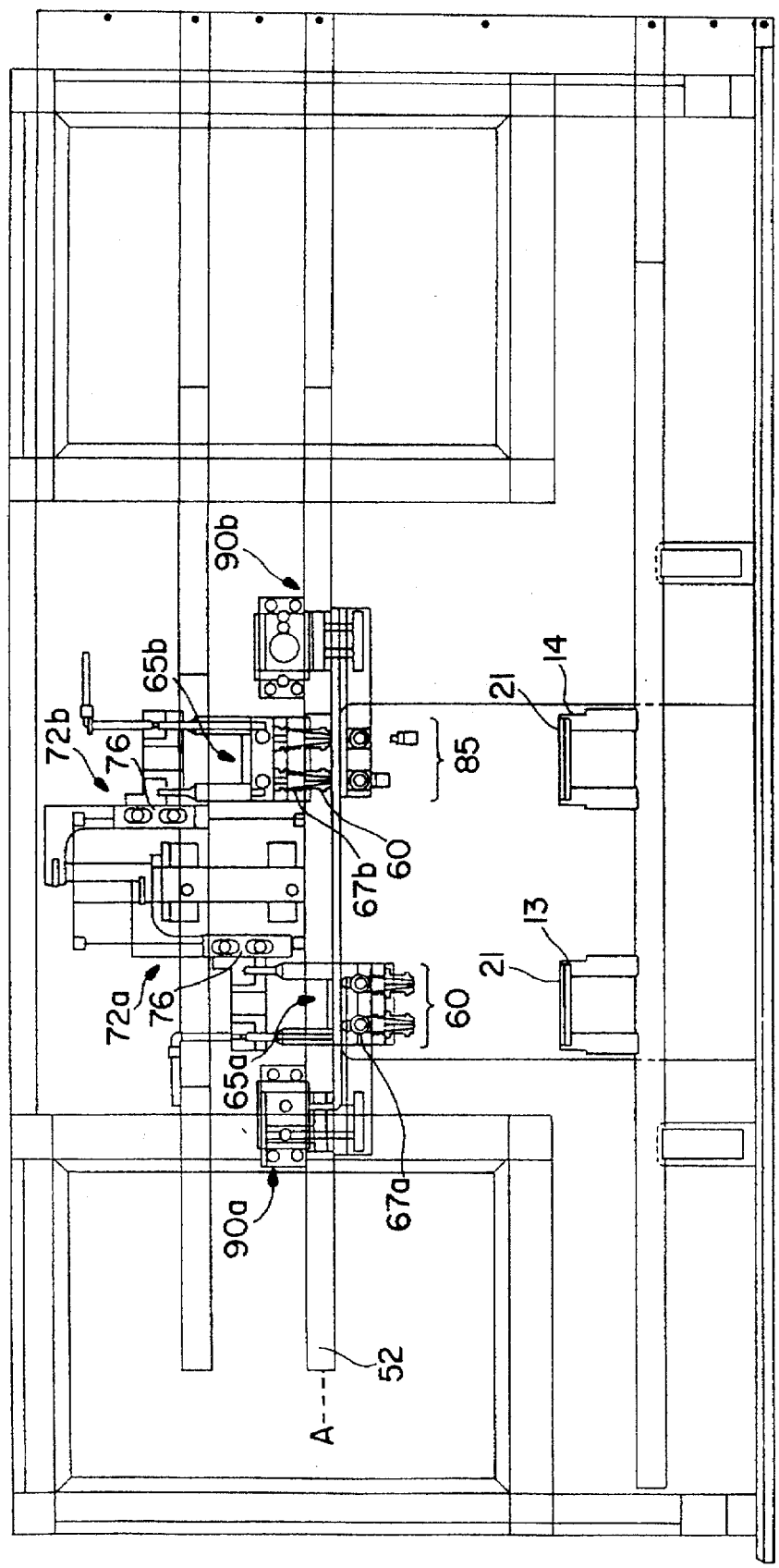

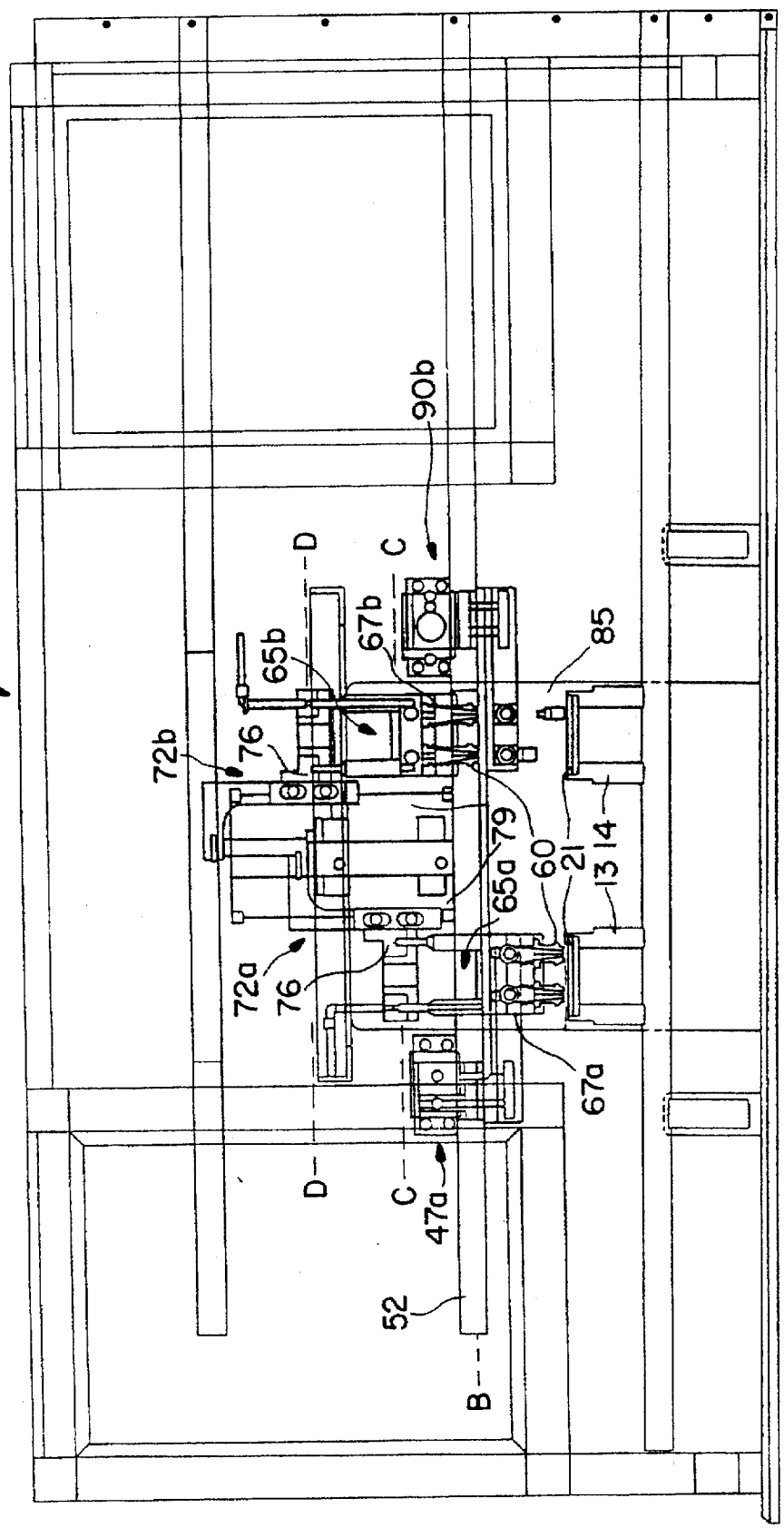

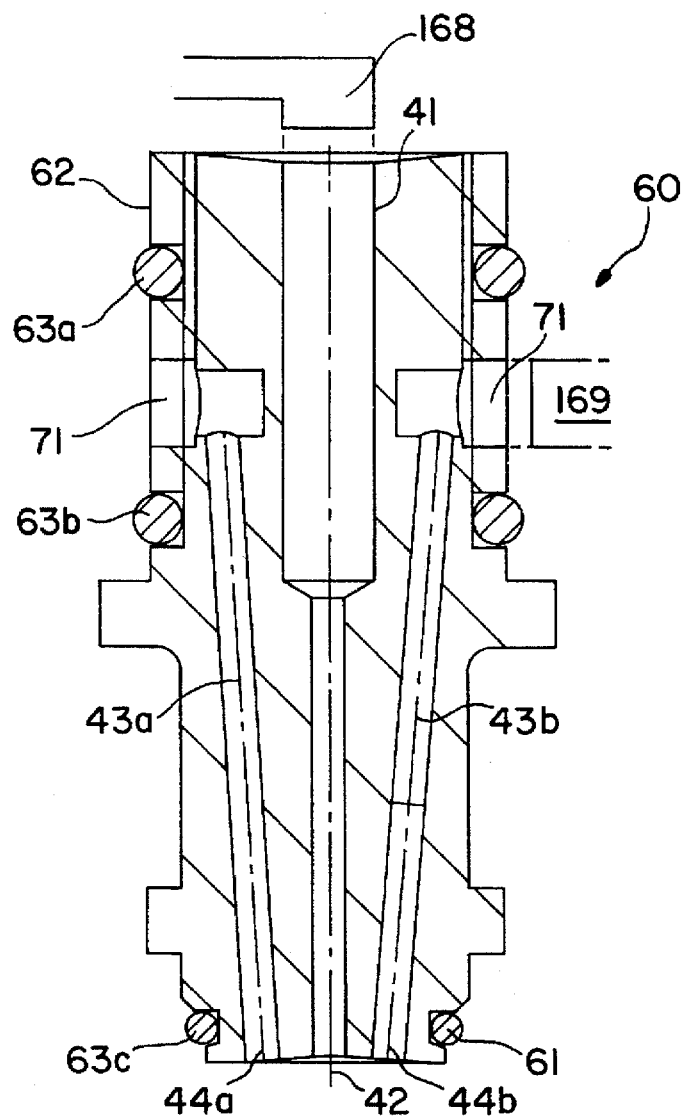
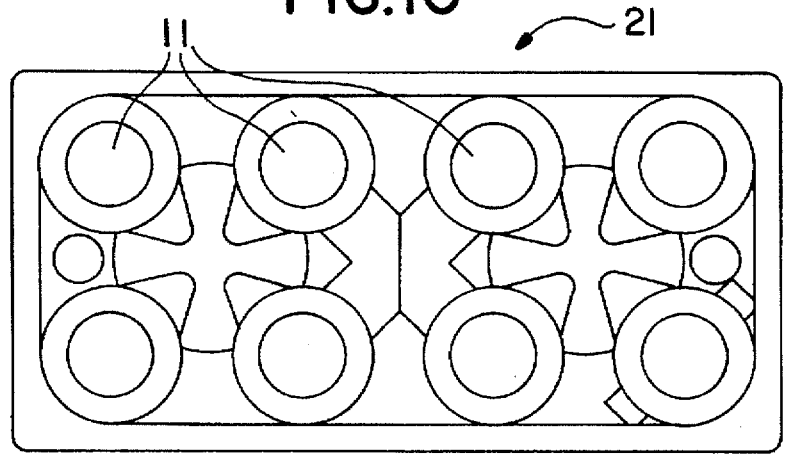

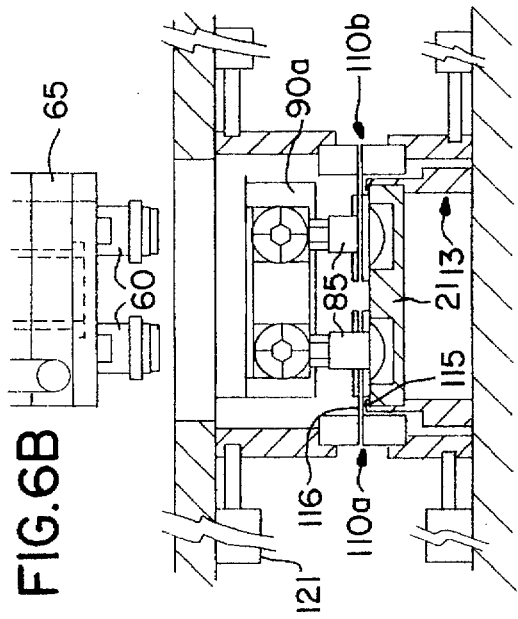
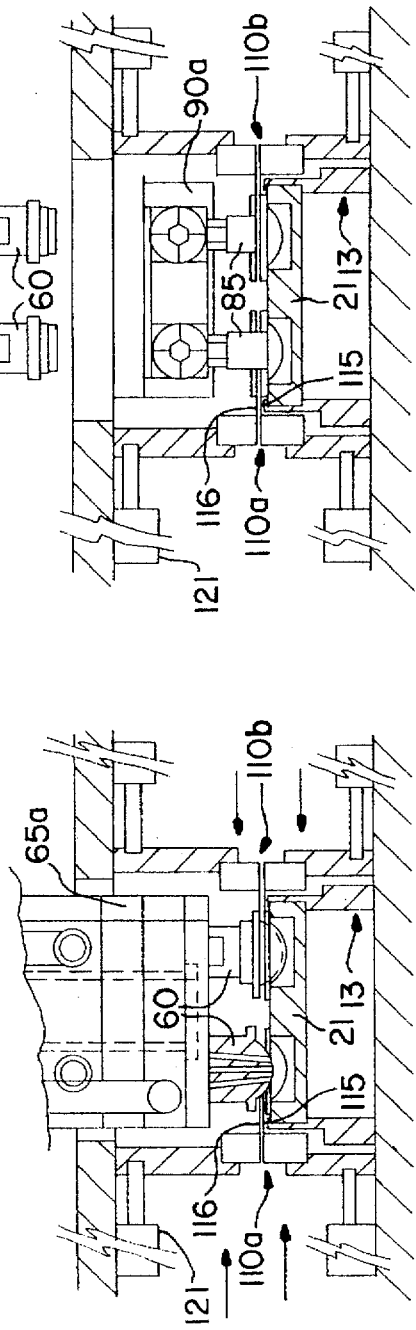
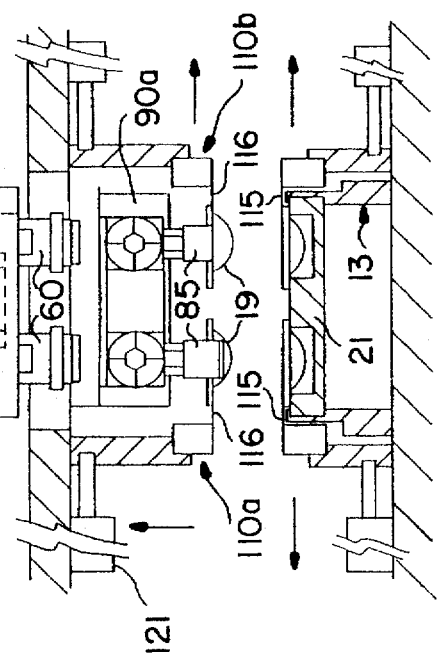

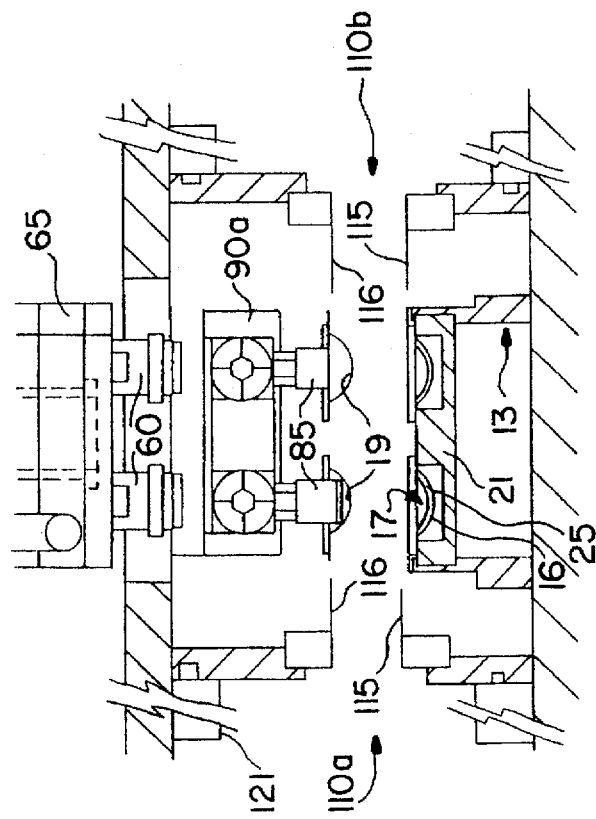
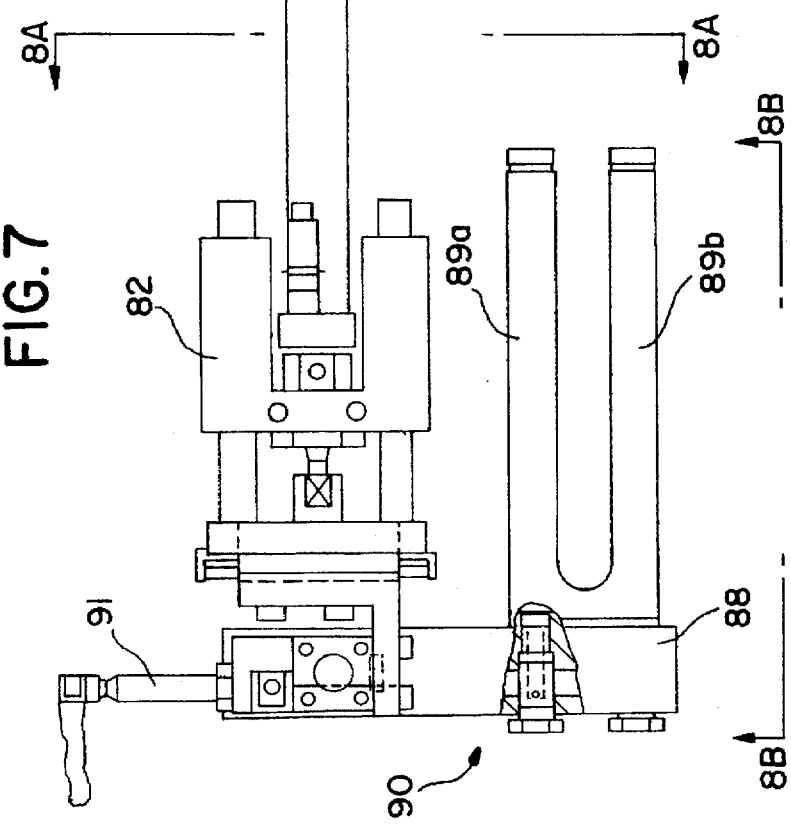

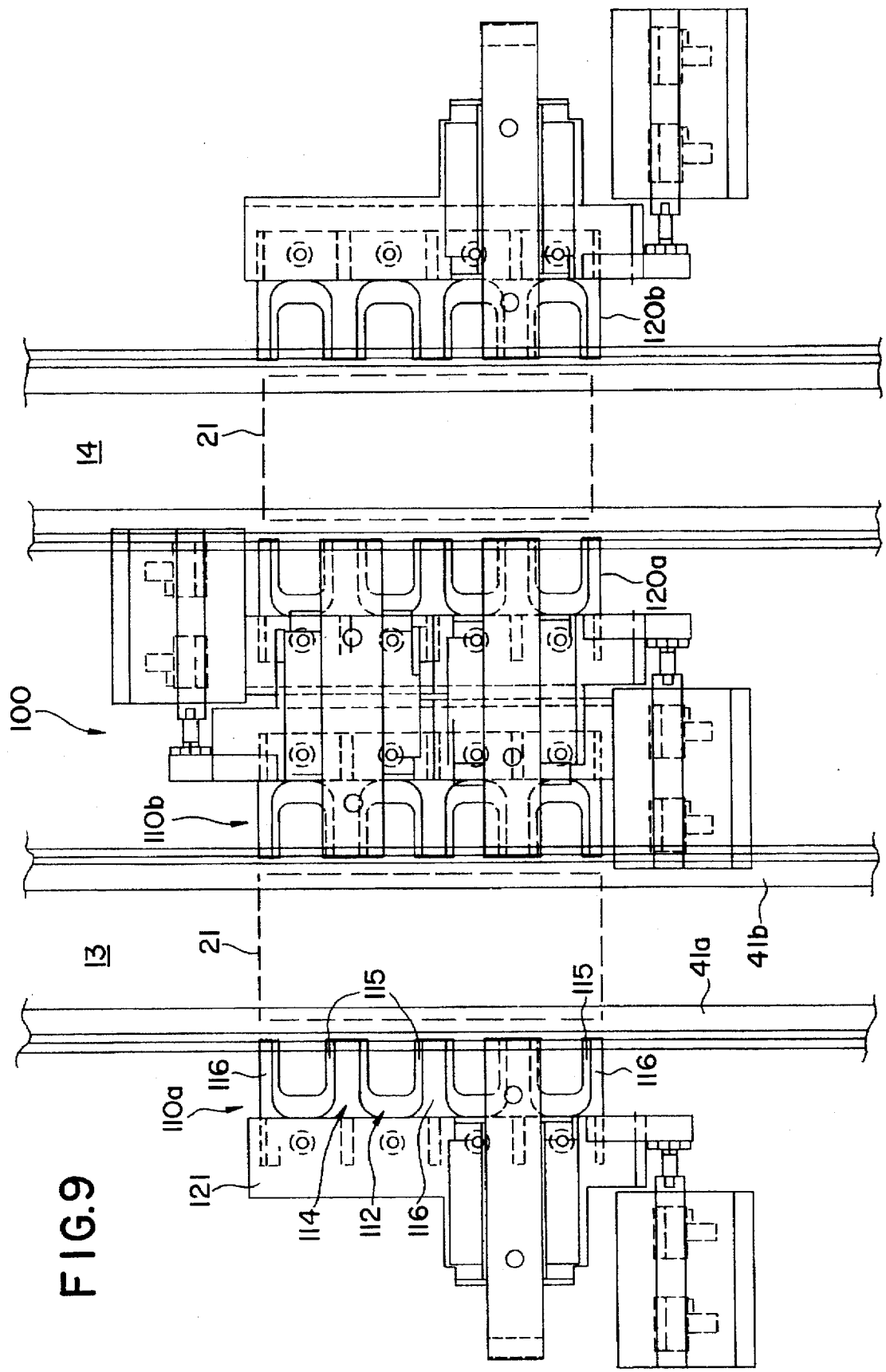

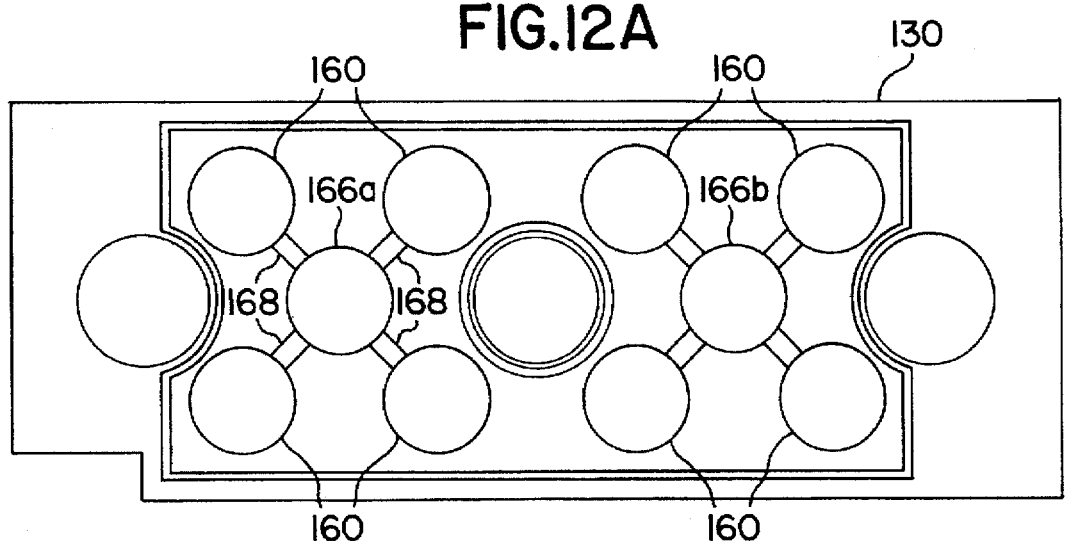
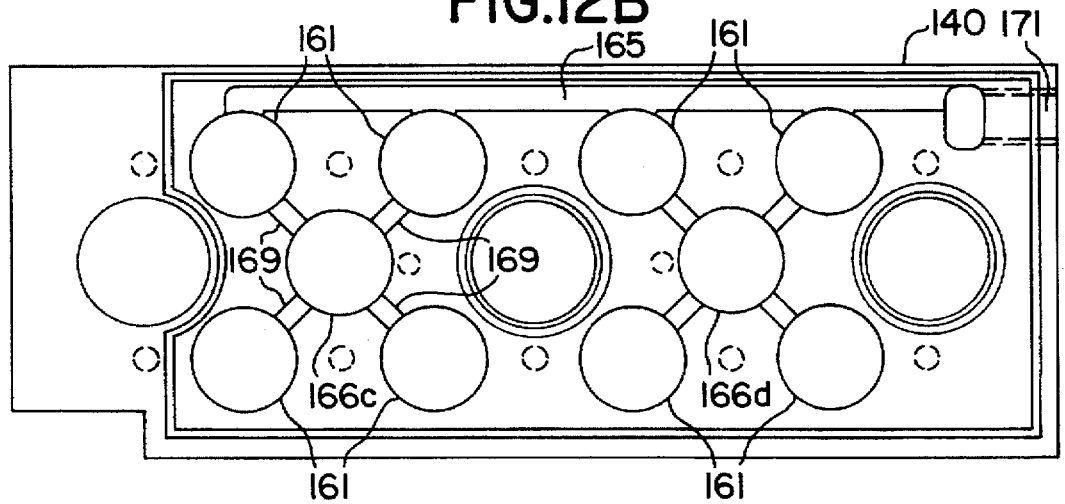
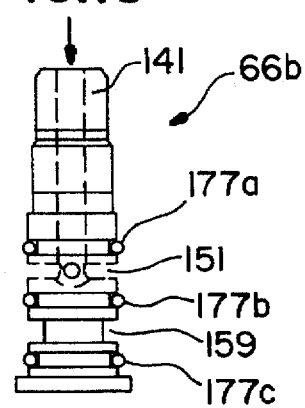

MOLD SEPARATION APPARATUS

This is a divisional of copending application Ser. No. 08/258,265, filed on Jun. 10, 1994.

FIELD OF THE INVENTION

This invention relates generally to the production of ophthalmic lenses, and, in particular to a method and a device for removing molded soft contact lenses, high-precision intraocular lenses, and the like, from the individual molds in which they are produced.

DESCRIPTION OF THE PRIOR ART

As the ophthalmic contact lens industry has grown, it has become desirable to supply contact lenses that are periodically and frequently replaced to minimize the possibility of user induced contamination. This has produced an opportunity for manufacturers to strive for automated methods and apparatuses that are able to automatically produce high quality ophthalmic lenses in a cost-effective and highly efficient manner.

It is current practice in the art of making ophthalmic lenses, such as soft contact lenses of the hydrogel type, to form a monomer or monomer mixture that may be polymerized in a plastic mold. Details of typical direct mold processes for forming soft hydrogel contact lenses can be found in U.S. Pat. Nos. 5,080,839, 5,039,459, 4,889,664, and 4,495,313. The process for forming soft contact lenses as generally described in the above-mentioned patents includes the steps of dissolving a monomer mixture in a non-aqueous, water-displaceable solvent and placing the monomer/solvent mixture in a mold having the shape of the final desired hydrogel lens. Next, the monomer/solvent mixture is subjected to conditions whereby the monomer(s) polymerize, to thereby produce a polymer/solvent mixture in the shape of the final desired hydrogel lens. After the polymerization is complete, the solvent is displaced with water to produce a hydrated lens whose final size and shape are similar to the shape of the original molded polymer/solvent article.

Examples of typical plastic molds used for carrying the polymerizable feed material are disclosed in U.S. Pat. Nos. 5,094,609, 4,565,348 and, 4,640,489. The mold disclosed in U.S. Pat. No. 4,640,489 is a two-piece mold with a female mold portion having a generally concave lens surface, and a male mold portion having a generally convex lens surface, both mold portions preferably made of a thermoplastic material such as polystyrene. As discussed in U.S. Pat. No. 4,640,489, polystyrene and copolymers thereof is a preferred mold material because it does not crystallize during cooling from the melt, and exhibits little or no shrinkage when subject to the processing conditions required during the direct molding process discussed above. Alternatively, molds made of polypropylene or polyethylene, such as described in U.S. Pat. No. 4,121,896, may be used.

During the molding process, the monomer and monomer mixture is supplied in excess to the female concave mold portion prior to the mating of the molds. After the mold portions are placed together, defining the lens and forming a lens edge, the excess monomer or monomer mixture is expelled from the mold cavity and rests on or between flanges that surround one or both mold portions. Upon polymerization this excess material forms an annular (HEMA) ring around the formed lens between the flange portions of the molds.

As discussed in the above-mentioned U.S. Pat. Nos. 5,039,459, 4,889,664, and 4,565,348, there is the requirement that the materials, chemistry, and processes be controlled so that the mold portions may be separated without having to apply an undue force, which may be necessary when the lens sticks to one or more of the lens mold or when the lens mold portions are adhered to each other by the excess HEMA ring after polymerization.

The prior art process for separating the mold portions and removing the lens therefrom consists of a heating stage, a prying open of the mold portions, and a lens removal stage. The heating stage of the prior art lens removal process is to apply heat by convection to the back mold portion by applying a heated air stream to the mold. The differential expansion between the heated mold polymer and the cooler lens polymer shifts one surface with respect to the other. A side pry bar is jammed between the molds from one side, and the back curve mold is pried to pivot the back curve mold upwardly from one side. The prying force then breaks the polymerized lens/polymer mold adhesion and separates the mold portions.

When mold parts formed with an integral frame, such as that illustrated in U.S. Pat. No. 4,640,489, are separated the frame limits access to the space between front and back curve mold halves. Further, even minimal warpage of the integral frame can adversely affect both the access to the space and the accuracy of the side pry forces.

Further, when access is limited, the side pry mechanism must be driven between the mold halves, which also affects the accuracy of the side pry forces.

The greater the temperature gradient between the mold halves and the lens, the less an adhesion force will exist between the lens and the mold halves and less force will be required to separate the mold portions. This effect is greatest when there is a maximum thermal gradient. Lower thermal gradients created between the mold halves and the lens will require a greater force to separate the mold portions resulting in increased possibility of fracturing a mold portion. Newer techniques for achieving a temperature gradient between the back lens mold and the contact lens include laser demolding techniques, such as described in co-pending U.S. application Ser. No. 08/257,801, assigned to the same assignee as the instant invention, or, by steam impingement as hereinafter described in detail below.

The lens mold portions, containing the polymerized contact lens therein, may be pried apart by mechanical leverage which may be provided manually. A test fixture used to measure the forces required to open the molds is described in above-mentioned U.S. Pat. No. 4,889,664, which discloses a holding fixture for holding the bottom half of the lens mold and a lever means positionable between the top mold half and bottom mold half for prying the top half away from the bottom half at a controlled rate.

SUMMARY OF THE INVENTION

It is an object of the present invention to provide a method and apparatus that can easily and repeatably separate the contact lens mold portions having a contact lens formed therebetween without damaging the lens.

It is another object of the present invention to provide an automated means to mechanically and reliably pry the mold halves apart in a consistent and reliable manner to thereby enhance the production of defect free lenses, and minimize the tearing of the lens or the breakage of the lens mold parts.

It is a further object of the present invention to provide a method and apparatus for separating a back curve mold from a front curve mold wherein the back curve mold is of a different temperature relative to a contact lens contained in a cavity formed between the two mold portions.

It is yet another object of the present invention to provide a method and apparatus for separating a back curve lens mold from a front curve lens mold wherein the back curves are removed and placed in a remotely located receptacle after separation.

It is another object of the invention to perform such separation without excessive environmental heating or waste of energy.

Another object of the instant invention is to reduce contact lens manufacture process time by applying steam heat to a contact lens mold assembly to create a thermal gradient between back curve and front curve lens mold portions thereof in a fast and efficient manner prior to mold separation.

These and other objects are attained by an apparatus for separating a back mold half from a front mold half of contact lens mold assembly useful in the production of a contact lens, each of the front and back mold halves having a central curved section defining a concave surface, a convex surface, and a circular circumferential edge, at least part of at least one of the concave surface and the convex surface having the dimensions of the front or back curve, respectively, of a contact lens to be produced in the mold assembly. The apparatus further comprises a means for applying steam to the concave surface of the back mold half while maintaining the convex surface of the front mold half at a first temperature to form a temperature gradient between the convex surface of the back mold half and the contact lens, wherein the temperature gradient ranges from about 2.5° C. to 6.0° C.; and, a prying means for insertion between the circumferential edges of each the front mold and back mold halves of the contact lens mold assembly, the prying means including a first set of pry fingers for biasing the back mold half at a predetermined force with respect to the front mold half to effectively remove the back mold half therefrom.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4(a) is a front elevational view of the steam demolding assembly illustrating the steam demolding assembly on one side and the suction cap assembly on the other side, both in a raised position, prior to engagement with the lens molds.

FIG. 4(b) is a front elevational view of the steam demolding assembly with a steam demolding assembly on one side shown in its lowered position to discharge steam to the back curve lens mold surface, and a suction cup assembly on the other side to remove the mold parts from the pry fingers.

FIG. 5 is a detailed cross-sectional view of the nozzle for discharging steam against the back curve lens mold surface.

FIGS. 6(a)–6(d) illustrate in detail the sequence of steps for separating the back curve mold portions from the front curve mold portions of a plurality of contact lens molds in a first embodiment of the mold separation apparatus; wherein FIG. 6(a) illustrates the device with the steam nozzles engaging the mold parts and the pry fingers engaging the mold flanges;

FIG. 6(b) illustrates the retraction of the steam nozzles, and engagement of the suction cup assembly;

FIG. 6(c) illustrates the upward pry motion of the assembly to remove the back curve mold part from the front curve mold and molded lens;

FIG. 6(d) illustrates the retraction of the pry fingers to allow removal of the back curve mold parts by the suction assembly, and advancement of the pallet containing the partially demolded lenses.

FIG. 7 illustrates the suction cup assembly 90 of the present invention.

FIG. 9 is a partial plan view of the demolding assembly illustrating two sets of pry fingers for each of the pallets conveyed on conveyor 13 and conveyor 14.

FIG. 10 is a top view showing pallet 21 having eight (8) contact lens molds situated therein.

FIG. 12(a) is a top plan view of the steam discharge manifold for distributing steam to each of the nozzle assemblies of steam discharging apparatus.

FIG. 12(b) is a top plan view of the condensate manifold for venting excess steam pressure during steam impingement to regulate the amount of steam discharged to the back curve lens mold surface.

FIG. 13 is a detailed cross-sectional view of the steam intake valve of the steam discharge apparatus.

DETAILED DESCRIPTION OF THE PREFERRED EMBODIMENTS

The ophthalmic lens to be demolded in the practice of the present invention is preferably formed in a cavity defined by contact lens mold portions formed the processes discussed in the U.S. patents mentioned in co-pending patent application U.S. Ser. No. 08/257,785 entitled "Optical Quality Mold Parts for Contact Lenses", assigned to the assignee of the present invention, and, the disclosure of which is incorporated by reference herein.

Figure 1:
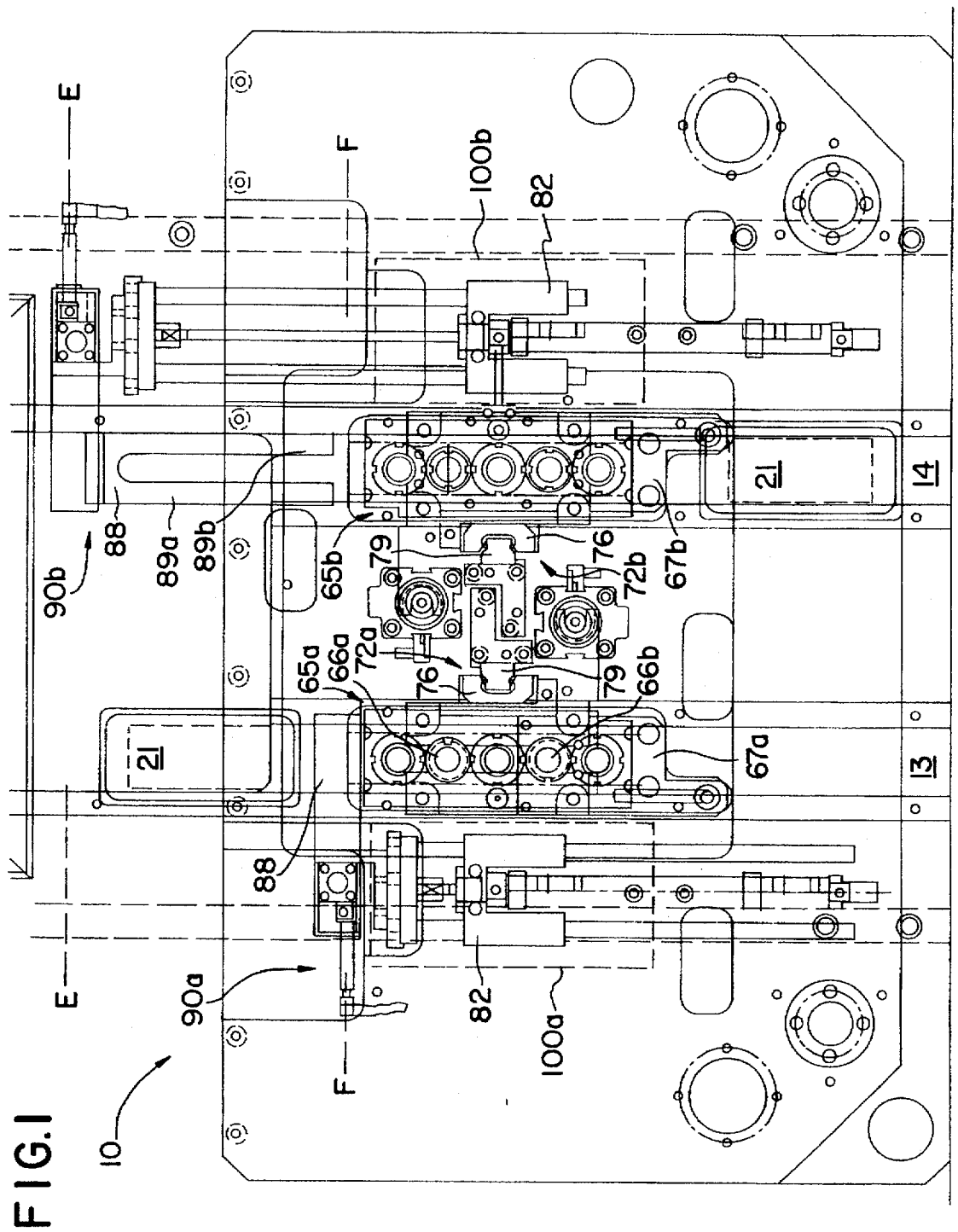
FIG. 1 is a general top plan view of the mold separation apparatus of the instant invention illustrating steam nozzle mounting assemblies, the steam head retraction assemblies, the suction cup assemblies, and two lens mold pallet conveyors Carrying pallets thereon.

FIG. 1 generally illustrates, in plan view, the mold separation apparatus 10 of the instant invention that generally comprises two essentially identical steam discharge apparatuses 65a,65b in addition to respective associated demolding assemblies 100a,100b, shown as phantom lines in the Figure, for accomplishing the simultaneous demolding two parallel lines of a plurality of contact lens molds each containing an ophthalmic lens therein. The use of two parallel lines increases the throughput of the production line. Each of the conveyors 13, 14 carry a series of pallets, generally illustrated at 21, which provide support and registration for a plurality of contact lens molds carried therein.

As illustrated in FIG. 1, pallets 21 containing the contact lens molds are conveyed along pallet conveyors 13,14 in the direction indicated by the arrows A. Each of the pallets 21 are positioned at respective steam discharge apparatuses 65a,65b and may be timed to arrive at the demolding assemblies 100a,b at the same time, or, may be timed to arrive in an alternative manner.

Each pallet conveyor 13,14 enables transport of a pallet 21 (shown generally in FIG. 2) that may carry one or more contact lens molds, each having a lens formed therein, through various processes of the contact lens production facility as discussed in greater detail in copending pending patent application U.S. Ser. No. 08/257,802 entitled "Low Oxygen Molding of Contact Lenses" also assigned to the same assignee as the instant invention and, the disclosure of which is incorporated by reference herein. The pallet and conveyance and registration means is described in greater detail in copending patent application U.S. Ser. No. 08/257,786 entitled "Contact Lens Production Line Pallet System" also assigned to the same assignee as the instant invention and incorporated by reference herein.

Figure 2:
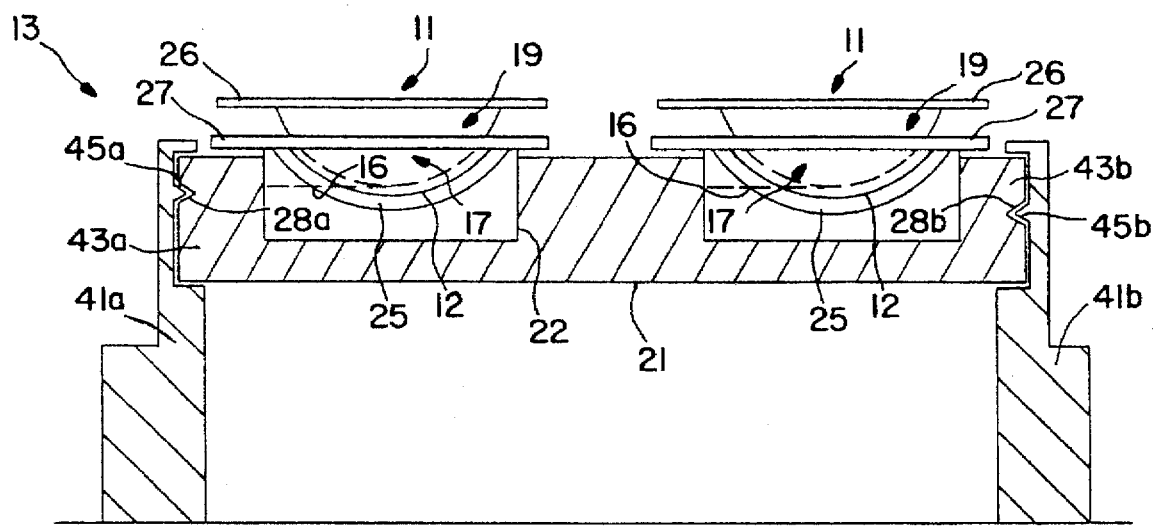
FIG. 2 is a front view of two lens molds situated in respective cavities of the lens mold pallet.

In the preferred embodiment as shown in FIG. 10, one production line pallet 21 accommodates up to eight (8) contact lens molds 11 for simultaneous processing throughout the mold separation apparatus 10 and the first portion of the contact lens production line (not shown). As illustrated in FIG. 2, each conveyor 13,14 comprises a parallel set of tracks 41a and 41b, each track 41a,b including a pair of tracking ribs 43a and 43b for mating with respective grooves 28a,b formed in the pallet 21. The paired set of ribs 43a,b and respective interlocking grooves 28a,b keep the pallet aligned as it is being conveyed within the demolding apparatus, and, as will be explained in detail below, prevents any vertical movement of the pallet 21 relative to the conveyor. A suitable registration means (not shown) is included for locating the pallets along the conveyor path for the demolding step.

The demolding assemblies 100a,100b of the mold separation apparatus 10 each physically pry the back curve half from the front curve half of each contact lens mold 11 to physically expose each contact lens situated in the lens mold for conveyance to a hydration station (not shown) located downstream of the apparatus 10 for hydration of the lenses. The prying process occurs under carefully controlled conditions, as will be explained in detail below, so that the back curve half 19 will be separated from the front curve half 17 without destroying the integrity of the lens 12 formed in the lens mold. To accomplish this, the mold separation apparatus 10 first prepares the back curve half 19 of each lens mold 11 to enable quick and efficient removal from its respective front curve 17 by applying a predetermined amount of heat, preferably in the form of steam, to the back curve half surface. To fully understand the mold separation process it is necessary to describe the details of the contact lens mold itself.

Figure 3:
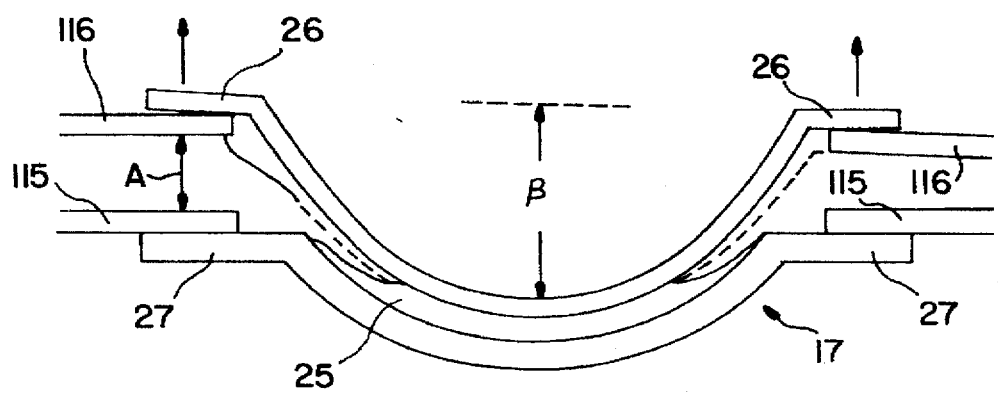
FIG. 3 is a diagrammatic side view showing generally the two sets of pry fingers lifting the back curve lens mold from the front curve lens mold.

As illustrated in FIGS. 2 and 3, soft contact lenses 12 are formed and polymerized in a mold cavity 25 formed between a front curve mold portion 17 and a back curve mold portion 19. The front curve portion 27 of the mold is carried within a recess 22 defined by pallet 21. In the formation of the lens, the front curve mold 17 is first partially filled with a monomer solution, and then the convex portion of back curve mold 19 is seated within the concave cavity of the front mold half under a vacuum to avoid the possibility of trapping an air bubble in the mold cavity. The mold halves are then weighted to squeeze them together to displace excess monomer into a space between flanges 26, 27. The assembled mold halves are then weighed again and precured in a low oxygen environment. Following precure, the lenses are fully cured with heat and UV radiation to fully polymerize the monomer matrix of the contact lens. These steps are described in greater detail in copending patent application U.S. Ser. No. 08/258,264 entitled "Spring Loaded Base Curve Deposition and Assembly Under Vacuum" and copending patent application U.S. Ser. No. 08/258,792 entitled "Mold Clamping and Precure". Each front and back curve 17,19 additionally include respective circumferential flanges 26,27 formed at the circumferential periphery of each lens mold portion to facilitate the prying apart of the lens mold 11. As shown in FIG. 3, the depth of the back curve 19, labeled "B" in the Figure, is approximately 4 mm. Also shown in FIG. 3, is a gap "A" located between the circumferential edge portion 26,27 of each lens mold 11 which is approximately 1 mm to 3 mm wide. The gap "A" is preferably 2 mm wide for adequately receiving prying fingers of the demolding assemblies 100a,b that are inserted therein for prying apart of the front and back curve lens mold portions as will be described in greater detail below.

As shown in the general front plan views of FIGS. 4(a), each steam discharging apparatus 65a,65b generally comprises a plurality of individual nozzle assemblies 60 each mounted in mounting head assembly 67a,b at fixed locations corresponding to the location of each lens mold 11 seated in the pallet 21. Thus, in the preferred embodiment, there are eight (8) individual nozzle assemblies 60 positioned in each mounting head assembly 67a,b. For illustrative purposes, FIGS. 4(a) and 4(b) illustrate a nozzle assembly above conveyor line 13 and a vacuum assembly above conveyor line 14 to provide a view of the device at two different axis planes through the Figures. The apparatus of the present invention is symmetrical with respect to the major components thereof for each of the lines.

Each mounting head assembly 67a,b and the nozzle assemblies 60 therein are mounted on a first mounting platform 52 which moves in a plane transverse to conveyors 13,14. The first mounting platform 52 is caused to vertically reciprocate between a first upper position indicated as "A" in FIG. 4(a), for a duration of time to allow the pallet 21 carrying the lens molds 11 to be registered beneath the mounting head assemblies 67a,b, and, a second lowered position indicated as "B" in FIG. 4(b) whereby each nozzle assembly 60 is registered in sealing proximity with the surface 18 of the back curve mold portion 19 to direct steam at the surface. The mounting platform 52 is reciprocally driven by a plurality of screw nut motor assemblies.

Figure 11:
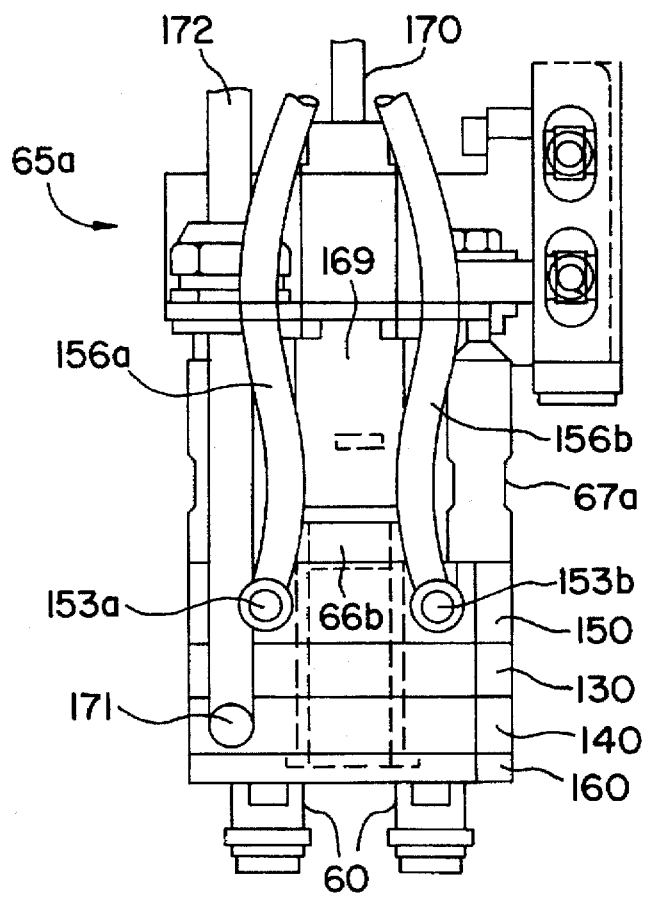
FIG. 11 is a detailed elevational side view of the steam discharging apparatus.

In the top plan view of FIG. 1, the mounting head assembly 67a of the steam discharging apparatus 65a includes two steam intake valves 66a,66b where pressurized steam is introduced from a suitable source into the assembly. Similar steam intake valves are present in the mounting head assembly 67b of the steam discharging apparatus 65b. A detailed front elevational view of steam discharging apparatus 65a is illustrated in FIG. 11 and shows the mounting head assembly 67a comprising a cover assembly 150, a steam distribution manifold 130 located immediately beneath cover assembly 150 for distributing steam from each of the two steam intake valves 66a,66b to the eight individual steam nozzle assemblies 60, a condensate manifold 140 located immediately beneath steam distribution manifold 140 for removing and regulating the steam pressure applied to the back curve lens mold surface during steam impingement, and a retaining plate 160 for retaining the individual steam discharge nozzles 60 and the steam intake valves 66b(,66a) in the apparatus. Also shown in FIG. 11 is steam intake valve 66b that is positioned within assembly 67a and in cooperative engagement with the steam and condensate manifolds 130,140 as will be described in detail below. The steam intake valve 66b(and 66a) communicates with steam intake pipe 170 via plenum 169 to provide pressurized steam to the steam distribution manifold 130. Additionally, a vacuum source (not shown) is connected via suitable piping 172 to the condensate manifold 140 at input 171 to evacuate the steam and to regulate the steam pressure applied to the back curve lens mold surface during steam discharge.

A top plan view of the steam distribution manifold 130 of steam discharge apparatus 65a is illustrated in FIG. 12(a). As shown in FIG. 12(a), the steam distribution manifold 130 is provided with a set of hollowed bores 160 that each seat a respective steam discharge nozzle assembly 60, and hollowed bores 166a,b that seat respective steam intake valves 66a,66b. Each bore 166a,b is provided with four (4) conduits 168 that extend therefrom and communicate with a central axial bore of a respective individual steam discharge nozzle assembly 60 to provide steam to each nozzle as will be explained in detail below.

A top plan view of the condensate manifold 140 of steam discharge apparatus 65a is illustrated in FIG. 12(b). As shown in FIG. 12(b), the condensate manifold 140 is also provided with a set of hollowed bores 161 each in axial alignment with the bores 160 of the steam discharge manifold, and bores 166c,d in axial alignment with the bores 166a,b of the steam discharge manifold for accommodating respective steam intake valves 66a,66b. Each bore 166c,d is provided with four (4) conduits 169 that extend therefrom and communicate with a hollowed annular ring of a respective individual steam discharge nozzle assembly 60 for removing steam, as will be explained in detail below. The condensate manifold 140 also defines a channel 165 that connects the vacuum source at input 171 with four of the hollowed bores 161 and the hollowed annular ring of a respective individual steam discharge nozzle assembly 60 when seated therein.

A detailed cross-sectional view of the steam intake valve 66b(66a) is shown in FIG. 13. Steam at 100° C. is input from a suitable source, as indicated by the arrow B in FIG. 13, through central axial bore 141 and distributed to radial bores 151 that are radially aligned with conduits 168 of the steam distribution manifold 130 when the valve is seated therein. Thus, steam is distributed from radial bores 151 via the conduits 168 to each of the individual steam discharge nozzles 60. In an alternative embodiment, the radial bores 151 may be replaced with a hollowed annular bore 151 that communicates with the central bore 141 of the steam intake valve and each of the conduits 168 of the steam distribution manifold. FIG. 13 also illustrates the steam intake valve 66b(,66a) as provided with a circumferential annular indent 159, such that, when the valve is seated within the discharge apparatus, the indent 159 is aligned with four of the bores 161 and channel 165 and each of the conduits 169 of the condensate manifold 140. When the vacuum is applied to input 171 to relieve the steam pressure within the manifold, the alignment of the piping 165, indent 159, and conduits 169 assures that the vacuum will be supplied to each of the discharge nozzle assemblies 60. A set of O-rings 177a,b,c surrounding the periphery of the steam intake nozzle 66a(,66b) are provided and may be formed of EDPM or other suitable polymer to provide an air-tight seal when seated within the respective manifolds of the discharge apparatus.

A detailed cross-sectional view of an individual nozzle assembly 60 is shown in FIG. 5. The nozzle 60 comprises a central axial bore 41 that forms a discharge orifice 42 located at the lower bottom 61 of the nozzle for discharging steam received from the steam distribution manifold 130. As mentioned above with respect to FIG. 12(a), the central axial bore 41 of a respective individual steam discharge nozzle assembly 60 receives pressurized steam from a respective conduit 168 of the steam manifold 130. Surrounding the centralized bore 41 is a hollowed annular ring 71 having a plurality of bores 43 extending therefrom, two of which 43a,43b are shown in the view of FIG. 5, and which terminate in venting orifices 44a,44b located concentrically around discharge orifice 42. The annular ring 71 of each nozzle 60 communicates with bore 161 and a respective conduit 169 of the condensate manifold 140 so that the vacuum from the vacuum source will be supplied to the bores 43a,b of the nozzle 60. During operation, the venting orifices 44a,b will simultaneously exhaust the steam when steam is applied to the back curve lens mold surface through discharge orifice 42.

The physical dimensions of the nozzle assembly 60 are best illustrated in FIG. 5. It comprises essentially a cylindrical upper end 62 having the discharge steam input orifice at the top surface thereof. A cylindrical lower end 61 that is smaller in diameter that the upper end has the discharge orifice 42 and venting orifices 44a,b. The diameter of the nozzle lower end 61 is in the range of approximately 12 mm to 18 mm, and is configured so that the discharge 42 and venting orifices 44a,b thereof protrude within the concave surface of the back curve lens 19 as shown in FIG. 6(a) so as to direct steam directly at the back curve surface. The length of the nozzle lower end 61 that protrudes within the depth "B" of back curve 19 (FIG. 3) is approximately 1 mm–2.5 mm.

Also shown in FIG. 5, surrounding the periphery of the nozzle upper and lower ends, are O-rings 63a,b,c that may be formed of EDPM or other suitable polymer for providing an air tight seal when the nozzle 60 is situated within the hollowed bores of the steam and condensate manifolds 130,140 of the mounting head assembly 67a(,b). As described in greater detail below, when the nozzle 60 is reciprocated to the back curve mold half 19, the O-ring 63c of the lower nozzle end 61 forms a seal with the outer surface 18 of the back curve 19, as illustrated in FIG. 6(a). The seal created between the O-ring 63c and the back curve mold creates a heating chamber between the nozzle and the back curve, and enables the steam discharged out of central discharge orifice 42 to be uniformly distributed along the outer surface of the back curve mold 19 thereby ensuring an even temperature profile along that portion of the back curve lens mold surface 18 that is adjacent the contact lens. Thus, a uniform temperature gradient is created between the back curve lens mold surface 18 and the contact lens 12 to aid in the separation of the lens mold 17 from the contact lens 12 in the mold separation apparatus 10. Furthermore, the vacuum exhaust ports 44(a)–(d) and the O-ring 63c(and the seal created with the back curve lens mold surface) prevent water condensation from forming on the back curve mold surface. Preferably, steam at a temperature ranging from 100° C. to 130° C., but preferably 100° C., is discharged for approximately 2–4 seconds with the venting orifices 44a,b simultaneously removing the steam from the lens mold surface after impingement.

Figure 12C:
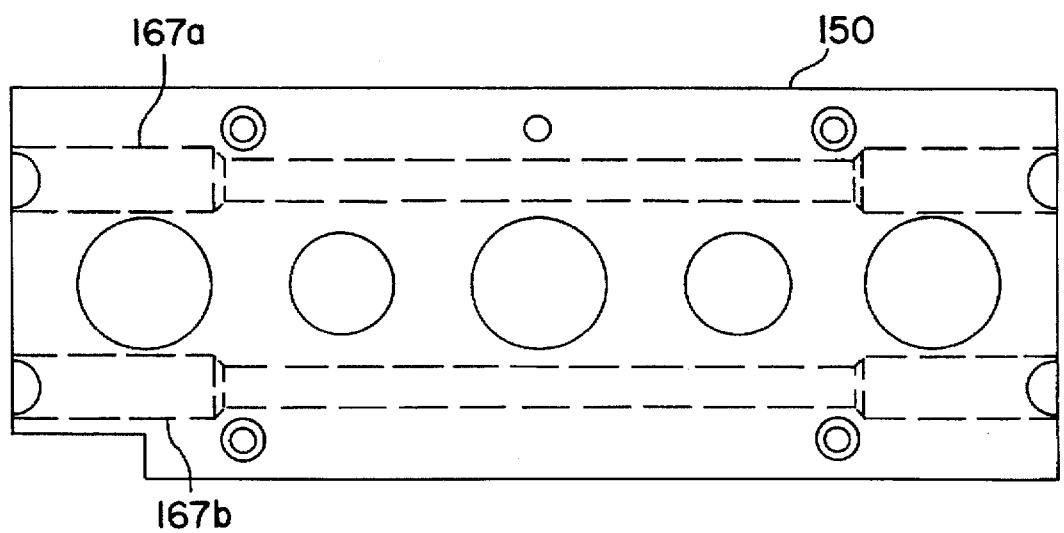
FIG. 12(c) is a top plan view of the cover assembly of the steam discharge apparatus showing piping for housing heater cartridges.

As illustrated in FIG. 12(c), the cover assembly 150 of the mounting head assembly 67a,b, includes bores 167a,b for accommodating one or more heater cartridges (not shown) which function to keep the nozzle assembly 60 at a temperature that will prevent water condensation from forming on the nozzle surface and to assist in preventing water condensation from forming on the back curve surface 18. Preferably, the temperature of the heater cartridges are programmed to maintain the temperature of the nozzle at 100° degrees Celsius or greater. The cover assembly 150, as illustrated in the front elevational view of FIG. 11, accommodates two heater cartridge inputs 153a,b connected with suitable heater cables 156a,b.

Each respective steam discharge assembly 65a,b of the mold separation apparatus 10 further includes a steam head retraction assembly 72a,b that enables each respective steam discharge assembly 65a,b to further reciprocate in a vertical direction relative to the mounting platform 52. As shown in the top plan view of FIG. 1 and in the front view of FIG. 4(b), each steam head retraction assembly 72a,b comprises a slidable mount 76 that is actuated to retract along a respective slide tower 79 from a steam discharging position, indicated by steam discharge apparatus 65a at position "C—C" (illustrated in FIG. 4(b)), to a non-discharging position (indicated by steam discharge apparatus 65b in FIG. 4(b) and apparatus 67a in FIG. 4(a)) at position "D—D" to retract the mounting head assembly 67a,b and the steam nozzles 60 from the individual lens molds after applying steam thereto. Retracting each mounting head assembly 67a,b after discharging steam is necessary to permit the suction cup assemblies 90a,b to reciprocate to a position where individual suction cups 85, two of which are shown in FIG. 4(b), are aligned with the eight lens mold back curves for removal from the pallet. Each steam head retraction assembly 72a,b is operable by means of a computer controlled stepper motor or by conventional pneumatic means (not shown).

Figure 8A:
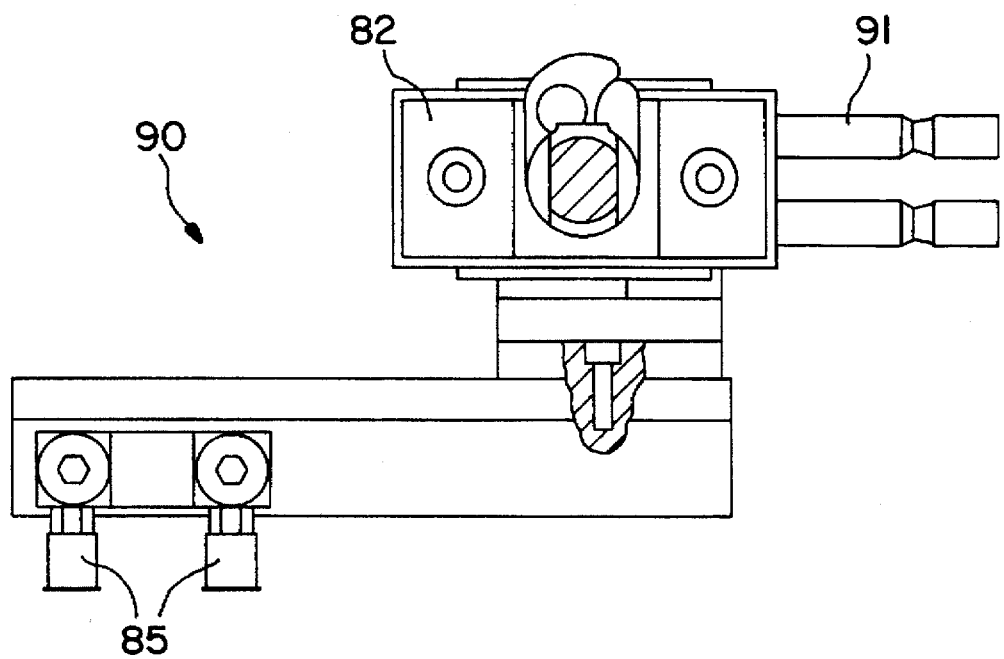
FIG. 8(a) illustrates a front view of the suction cup assembly 90 taken along line 8'—8' of FIG. 7.
Figure 8B:
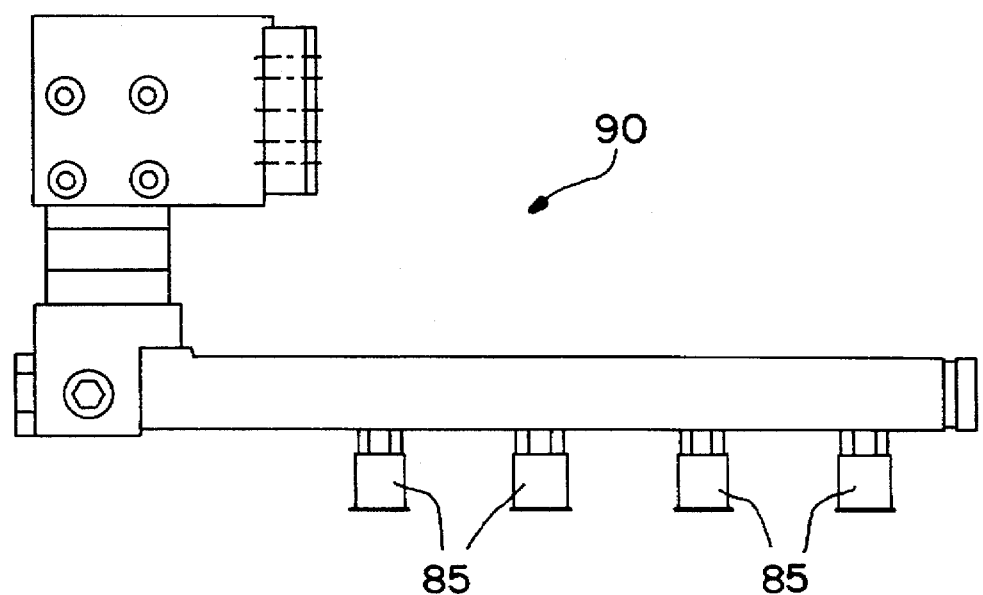
FIG. 8(b) illustrates a side elevational view of the suction cup assembly 90 taken along line 8"–8" of FIG. 7.

The two suction cup assembly units 90a,b shown in FIGS. 4(a) and 6(b) are each mounted on the movable platform 52 and both reciprocate in both horizontal and vertical directions with respect to the pallets and mold parts. As shown in the detailed view of FIGS. 7, 8(a) and 8(b), each suction cup assembly unit 90 comprises a U-shaped mounting unit 88 having legs 89a,b that accommodate suction cups 85 positioned in a one-to-one correspondence with the individual contact lens molds 11 of a respective pallet. Thus, as illustrated in FIG. 8(a) each leg 89a,b has four (4) suction cups that are spaced apart for gripping a respective back curve lens mold. As mentioned generally above, each suction cup 85 of the suction cup assembly unit 90a,b vacuum grips a respective back curve of a corresponding lens mold after the prying operation described in detail below. The U-shaped mounting unit 88 and the legs 98a,b thereof reciprocate along fixed guided mounts 82 by conventional pneumatic means. The vacuum suction is provided to each of the plurality of suction cups 85 via conduit 91 shown in FIG. 7.

After applying steam when the mounting platform 52 is in position "B" and each mounting head assembly 65a,b is in position "C—C" as illustrated in FIG. 4(b), and, further, after pry fingers are inserted between the gap formed between the circumferential edge portions of each of the front and back curve molds to be discussed below, the mounting head assembly 65a (and 65b) and steam nozzles 60 thereof are caused to reciprocate to an upper position "D—D". This is accomplished by the steam head retraction assembly 72a,b in the manner described above to permit the suction cup assembly 90a, as shown in FIG. 1, to extend from its non-gripping position indicated at "E—E", to its vacuum gripping position indicated at "F—F" so that each suction cup 85 is located above the surface of the back curve 19 of each lens mold 11.

In the preferred embodiment, the demolding assembly 100, shown in the top plan view of FIG. 9, comprises two paired sets of pry tools 110a,b and 120a,b each corresponding to respective pallet conveyors 13,14. As shown in the FIG. 9, the first set of four pry tools 110a and a second set of four pry tools 110b are located on respective opposite sides of the conveyor 13 to enable the removal of the back curve lens mold from the front curve for each of the eight lens molds situated in the registered pallet 21 as shown by the phantom lines on conveyor 13. Each set of tools 110a,b and 120a,b include upper and lower fingers which separate vertically, one from the other, in a manner to be herewith described in detail. Similarly, a first set of four pry tools 120a and a second set of four pry tools 120b are located on respective opposite sides of the conveyor 14 to enable the removal of the back curve lens mold from the front curve for each of the eight lens molds situated in the registered pallet shown by the phantom lines on conveyor 14. The description that follows is directed to one paired group of pry tools, e.g., 110a,b, but it is understood that the following description applies equally to the other paired group of pry tools 120a,b for the pallet conveyed on conveyor 14.

Preferably, each of the respective group of pry tools 110a,b and 120a,b consist of a bottom group of contiguously connected U-shaped members 112 having finger portions 115 thereof, and a top group 114 of contiguously connected U-shaped mounting members having finger portions 116 thereof. As shown in the detailed side view of FIG. 3, the top group of pry finger is situated directly above the bottom group of pry fingers and may be simultaneously inserted into the gap "A" of FIG. 3 defined between the circumferential edge portion 26 of the back curve and the circumferential edge portion 27 of the front curve as described above. In the preferred embodiment, each group of pry tools are made of stainless steel and each set of fingers 115,116 range from 0.3 mm to 1.5 mm in thickness so that they may be precisely inserted within gap "A" (FIG. 3). The top and bottom fingers 115,116 of pry tools 110a are further reciprocable in a vertical direction with respect to each other to perform a prying operation, as will be explained in detail below.

Immediately before or during the application of steam to the back curve lens mold surface 18 by the steam nozzles 60 as described above, the top finger 116 and bottom finger 115 of pry tools 110a,b are extended laterally toward each lens mold 11 in the direction indicated by the arrows C in FIG. 9 so that both respective finger portions 115,116 are registered in the gap "A" (of FIG. 3) defined between the circumferential flange portions 26,27 of each of the lens molds, as described above with respect to FIG. 3. Both top and bottom sets of pry fingers 115,116 may be reciprocated in the lateral direction by conventional solenoid, stepper motor, of pneumatic means 121, shown generally in FIG. 9.

The top fingers 116 and the U-shaped member 114 of the paired set 110a are vertically raised in an upward direction at a predetermined amount of time, preferably 1.5 seconds, after steam is applied to the back curve lens mold surface to bias each back curve lens mold from its respective front curve half for the eight lens molds situated in the registered pallet 21 in the monomer illustrated in FIG. 3. In the preferred embodiment, the motion of the top set of pry fingers 116 is calculated so as to impart a predetermined amount of force of approximately 5.0N to 40.0N to effectively bias and remove the back curve halves from the front curve halves.

SUMMARY OF OPERATION

During operation, the first mounting platform 52 mounting steam discharge apparatus 65a and eight nozzles assemblies 60 is reciprocated to its first upper position labelled as position "A" in FIG. 4(a) to allow a pallet 21 carrying up to eight lens molds each to come to a stop in registration beneath it so that the eight individual steam discharge nozzle assemblies 60 are in one-to-one correspondence with each of the eight contact lens molds 11 contained in the pallet 21 and conveyed by conveyors 13,14.

The first mounting platform 52 and steam discharge apparatus 65 thereof are then reciprocated to a second lower position labelled as position "B" in FIG. 4(b) so that each EDPM O-ring 63c of nozzle 60 forms a seal between the lower discharging end 61 and the back lens mold curve 19. Then, steam at 100° C. is applied to the surface of the back curve 19, while the temperature of the front curve lens mold portion is maintained at a temperature ranging from 30° C. to 85° C. The sudden heating of the back curve 19 creates a temperature gradient between the back curve lens mold half and the contact lens. To enable minimum demold force, the optimum temperature gradient created between the back curve mold half and the contact lens by steam application ranges from 2.5° C. to 6° C.

As shown in FIG. 6(a), during the time the steam discharge apparatus 65a and the steam nozzles 60 discharge steam to the back curve of the individual lens molds, the set 110a of pry fingers are extended, as indicated by the arrows, for insertion between the gaps formed between the respective front and back curves for each of the four lens molds situated on one side of the pallet 21. Likewise, the set 110b of pry fingers are extended for insertion between the gaps formed between the respective front and back curves of each of the four lens molds situated on the opposite side of the pallet 21 as shown in FIG. 6(a).

As shown in detail in FIG. 3, each set of pry tools 110a,b are inserted in a manner such that the fingers 115 of the bottom group 112 of pry tools thereof anchors the circumferential or annular rim portion 27 of the front curve of the lens mold to the surface of the pallet so that when the top group of pry tools 114 and fingers 116 thereof vertically separate (FIG. 6(c)), the back curve mold portion of the lens mold will easily separate (FIG. 6(c)) from the front curve mold portion without destroying the integrity of the contact lens 12 or either of the mold parts.

As illustrated in FIG. 3, the use of a controlled lifting motion between pry fingers 115 and 116 tends to bow the convex portion 19(a) inwardly which will initiate a bilateral separation of the back curve lens, as denoted at 12(a) and 12(b). This, in turn, initiates a standing wave 12(c) in the material which travels downwardly along the convex surface of the back curve mold half. If the upward movement of the back curve mold half does not exceed the downward propagation rate of the standing wave in the material, then the back curve will be lifted cleanly without tearing the lens.

As the back curve is lifted free, it carries with it the excess HEMA ring 12(d) which may be preferentially retained on the back curve by means of corona treatment of the back curve, or by surfactant treatment of the front curve.

Next, as illustrated in FIG. 6(b) after discharging the precision controlled amount of steam, the mounting head assemblies 67a,b and the steam nozzles 60 thereof are retracted by the steam head retraction assembly 72 to enable the suction cup assembly unit 90a to extend from position "E—E" to position "F—F" (FIG. 1) over the pallet and as shown in FIG. 6(b).

During the separation step illustrated in FIG. 6(c), the vacuum suction for the suction cup assembly 90a is activated, and the top group 114 of pry tools having fingers 116 are caused to separate from the lower group 112 of pry tools 115 to bias the circumferential edges of each of the back curves of each lens mold away from each of the front curves 17 which retain a respective contact lens therein and are anchored by the lower group of pry fingers 115. Thus, the back curve lens molds 19 are effectively removed from their respective front curve lens mold portions and retained by individual suction cups 85.

Finally, as shown in FIG. 6(d), the upper and lower sets of pry fingers 115,116 are retracted laterally in opposite directions to allow each pallet 21 now containing up to eight front curve lens mold portions and a respective contact lens therein, to continue along its respective conveyor path, while the suction cups 85 retain the corresponding individual suction cups 80 for disposal. Preferably, the suction cup assembly 90a,b is retracted to its position "E—E" (FIG. 1) and the vacuum may be removed therefrom so as to release the removed back curve lens mold portions. The separated mold parts are dropped in a bin at the retracted position, and evacuated by a vacuum line (not shown) for disposal.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

We claim:

1. A steam nozzle assembly for heating a back curve half of a contact lens mold assembly, wherein said contact lens mold assembly includes a contact lens molded between a front curve half and a back curve half, said steam nozzle assembly including:
   (a) a plurality of steam nozzles for engaging a plurality of contact lens mold assemblies, each of said nozzles including:
      (i) means for sealing said nozzle to said mold assembly to create a heating chamber between said nozzle and said contact lens mold assembly;
      (ii) a steam orifice for discharging steam into said heating chamber; and
      (iii) at least one port defined in each of said nozzles for exhausting steam from said heating chamber;
   (b) means for moving said steam nozzles into engagement with said contact lens mold assemblies;
   (c) a first plenum for distributing steam to each of said nozzles; and
   (d) a second plenum for drawing a vacuum through each said port in each of said nozzles to exhaust steam from said heating chamber whereby a temperature gradient may be created between said back curve mold half and the contact lens in said contact lens mold assembly.

2. A steam nozzle assembly as claimed in claim 1, which further includes a means for supplying a predetermined amount of steam to said heating chamber.

3. A steam nozzle assembly as claimed in claim 1 wherein said means for moving said steam nozzles into engagement with said contact lens mold assembly further includes means for advancing said nozzles into close proximity with a surface of said back curve half prior to discharging steam and for retracting said nozzles away from said surface of said back curve half after steam impingement thereon.

4. A steam nozzle assembly as claimed in claim 1 wherein said means for sealing said nozzle to said mold assembly further includes a means for creating a substantial air-tight seal between said nozzle and said back curve half prior to steam impingement thereupon.

5. A steam nozzle assembly as claimed in claim 4 wherein said means for creating a substantial seal is an O-ring gasket formed around a periphery of said nozzle.

6. A steam nozzle assembly as claimed in claim 1, which further includes a heater means for vaporizing any condensation that may form on a surface within the nozzle assembly.

7. A steam nozzle assembly as claimed in claim 6 wherein said heater means includes cartridge heaters located in predetermined locations in said nozzle assembly.

8. A steam nozzle assembly as claimed in claim 1 wherein said at least one port comprises a plurality of vent orifices which surround said steam orifice.

9. A steam nozzle assembly as claimed in claim 2 which further includes a control means and a valve means for supplying said predetermined amount of steam.

* * * * *